United States Patent
Tezuka

(10) Patent No.: US 10,751,846 B2
(45) Date of Patent: Aug. 25, 2020

(54) MACHINE TOOL AND STANDBY TIME CHANGING METHOD

(71) Applicant: FANUC CORPORATION, Yamanashi (JP)

(72) Inventor: Hiroki Tezuka, Yamanashi-ken (JP)

(73) Assignee: Fanuc Corporation, Yamanashi (JP)

(*) Notice: Subject to any disclaimer, the term of this patent is extended or adjusted under 35 U.S.C. 154(b) by 140 days.

(21) Appl. No.: 15/996,801

(22) Filed: Jun. 4, 2018

(65) Prior Publication Data

US 2018/0345430 A1 Dec. 6, 2018

(30) Foreign Application Priority Data

Jun. 5, 2017 (JP) ................. 2017-110860

(51) Int. Cl.
*B23Q 3/08* (2006.01)
*G05B 19/402* (2006.01)
(Continued)

(52) U.S. Cl.
CPC ............ *B23Q 3/08* (2013.01); *B23Q 16/10* (2013.01); *G05B 19/402* (2013.01); *B23Q 16/06* (2013.01); *B23Q 2220/004* (2013.01)

(58) Field of Classification Search
CPC .......... B23Q 3/08; B23Q 16/10; B23Q 16/06; B23Q 2220/004; B23Q 1/25;
(Continued)

(56) References Cited

U.S. PATENT DOCUMENTS

| 5,239,892 A | 8/1993 | Sakai |
| 2002/0045997 A1* | 4/2002 | List ................. G01R 31/3016 702/125 |
| 2015/0115514 A1 | 4/2015 | Ogawa |

FOREIGN PATENT DOCUMENTS

| CN | 201815922 U | 5/2011 |
| CN | 103567813 A | 2/2014 |

(Continued)

OTHER PUBLICATIONS

Performance Motion Devices Inc., "Magellan Motion Control IC User's Guide", [online], Apr. 2015, [retrieved on Dec. 26, 2019], retrieved from <https://performance-motion-devices.s3.amazonaws.com/uploads/ea5fa5f2-c915-4051-afc9-8d88e3942365/Magellan+Motion+Processor+Users+Guide.pdf> (Year: 2015).*
English Abstract and Machine Translation for Japanese Publication No. JPH06-155231 A, published Jun. 3, 1994, 10 pgs.
English Machine Translation for Japanese Publication No. JPH02-118696 U, published Sep. 25, 1990, 4 pgs.

(Continued)

*Primary Examiner* — Thomas C Lee
*Assistant Examiner* — Charles Cai
(74) *Attorney, Agent, or Firm* — Fredrikson & Byron, P.A.

(57) ABSTRACT

A machine tool is equipped with a rotary table, and a clamp mechanism which clamps the rotary table in a manner so that the rotary table does not rotate. A clamping operation by the clamp mechanism is started after a standby time has elapsed from completion of indexing of the rotary table. The machine tool further includes a positional deviation calculating unit adapted to calculate a positional deviation of the rotary table when the clamping operation by the clamp mechanism is completed, and a standby time changing unit adapted to shorten the standby time in the case that an absolute value of the positional deviation is less than a threshold value, and to lengthen the standby time in the case that the absolute value of the positional deviation is greater than the threshold value.

6 Claims, 5 Drawing Sheets

(51) Int. Cl.
*B23Q 16/10* (2006.01)
*B23Q 16/06* (2006.01)

(58) Field of Classification Search
CPC ........ G05B 19/402; G05B 2219/50047; G05B 2219/42213; G05B 2219/49134
See application file for complete search history.

(56) References Cited

FOREIGN PATENT DOCUMENTS

| | | | | |
|---|---|---|---|---|
| CN | 105798616 | A | 7/2016 | |
| EP | 2106878 | A1 | 10/2009 | |
| JP | 2118696 | U | 9/1990 | |
| JP | 6155231 | A | 6/1994 | |
| JP | 6179152 | A | 6/1994 | |
| JP | 7266166 | A | 10/1995 | |
| JP | 2009248242 | A | * 10/2009 | ............. B23Q 16/10 |
| JP | 2009248242 | A | 10/2009 | |
| JP | 201587820 | A | 5/2015 | |
| JP | 201687788 | A | 5/2016 | |

OTHER PUBLICATIONS

English Abstract and Machine Translation for Japanese Publication No. JPH06-179152 A, published Jun. 28, 1994, 9 pgs.
English Abstract for Japanese Publication No. 2015087820 A, published May 7, 2015, 1 pg.
English Abstract for Japanese Publication No. 2009248242 A, published Oct. 29, 2009, 1 pg.
Untranslated Decision to Grant a Patent mailed by Japan Patent Office (JPO) for Application No. 2017-110860, dated May 28, 2019, 3 pgs.
English Machine Translation of Decision to Grant a Patent mailed by Japan Patent Office (JPO) for Application No. 2017-110860, dated May 28, 2019, 2 pgs.
Untranslated Notice of Reasons for Refusal mailed by Japan Patent Office (JPO) for Application No. 2017-110860, dated Mar. 5, 2019, 2 pgs.
English Machine Translation of Notice of Reasons for Refusal mailed by Japan Patent Office (JPO) for Application No. 2017-110860, dated Mar. 5, 2019, 2 pgs.
English Abstract and Machine Translation of Chinese Publication No. 103567813 A, published Feb. 12, 2014, 12 pgs.
English Abstract and Machine Translation of Chinese Publication No. 105798616 A, published Jul. 27, 2016, 9 pgs.
English Abstract and Machine Translation of Chinese Publication No. 201815922 U, published May 4, 2011, 6 pgs.
English Abstract and Machine Translation of Japanese Publication No. 2016-087788 A, published May 23, 2016, 8 pgs.
English Abstract and Machine Translation of Japanese Publication No. H07-266166 A, published Oct. 17, 1995, 7 pgs.
English Machine Translation of German Office Action for German Application No. DE102018084370.4, dated Feb. 5, 2020, 7 pgs.
Riefenstahl, "Elektrische Antriebssysteme: Grundlagen, Komponenten, Regelverfahren, Bewegungssteuerung," 3., Durchgesehene und verbesserte Auflage, published 2010, pp. 255-256.

* cited by examiner

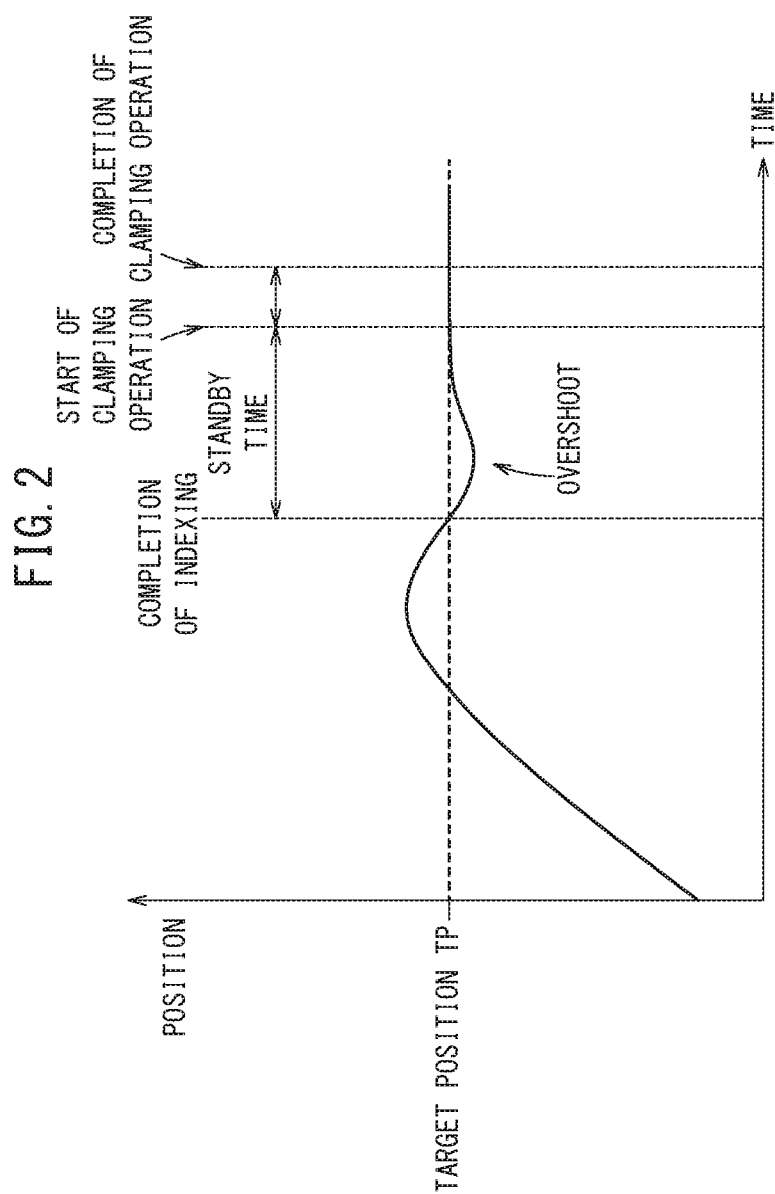

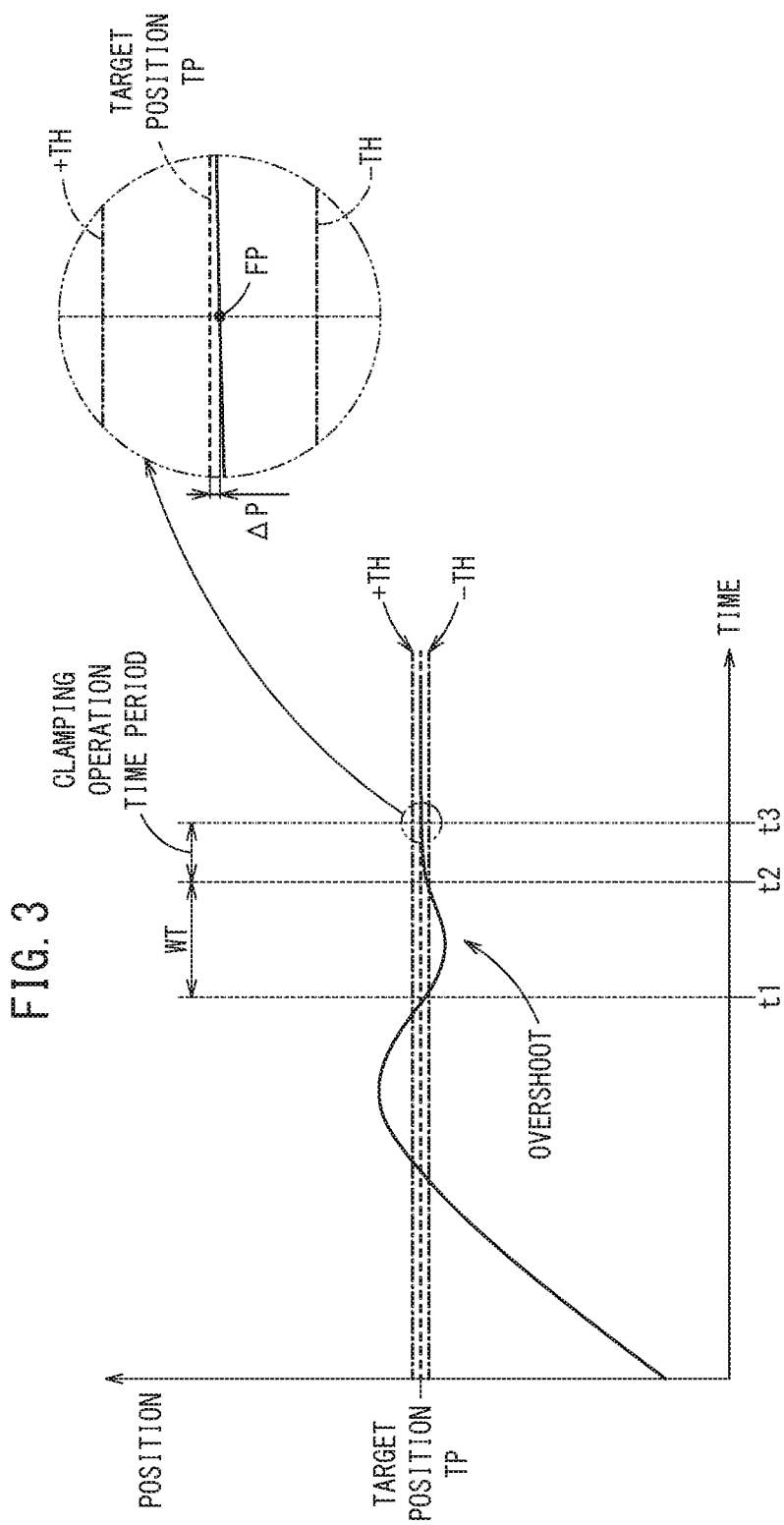

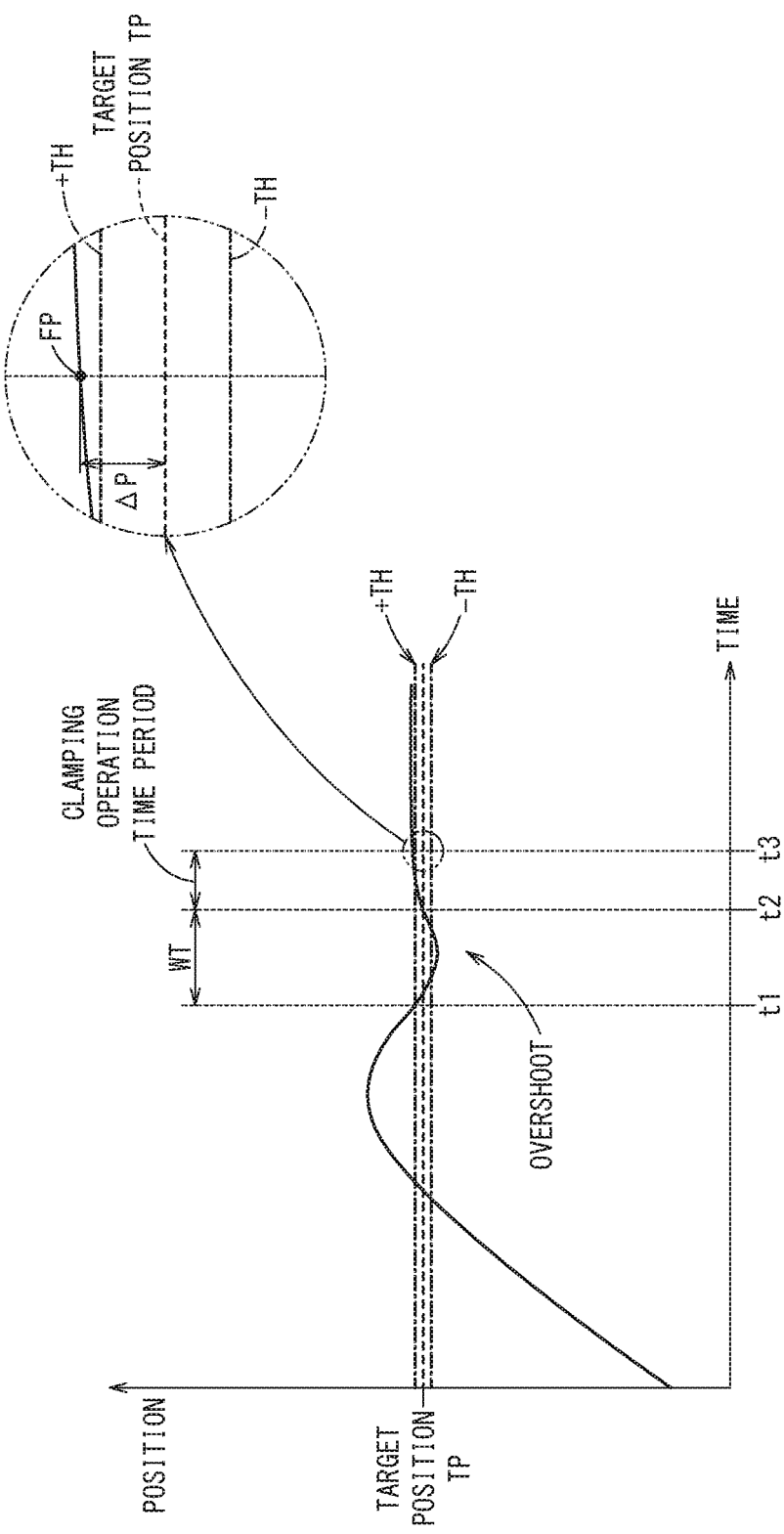

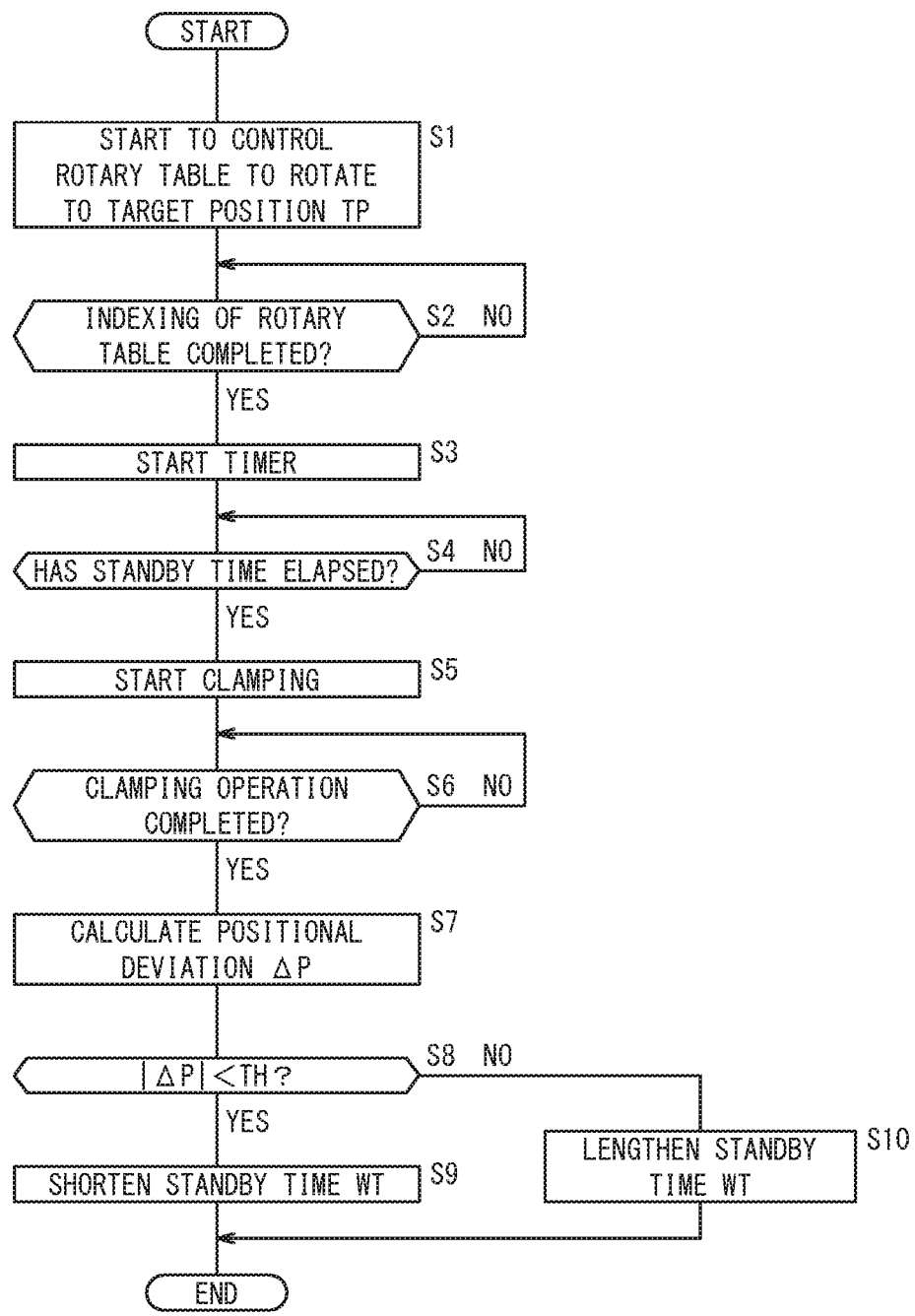

MACHINE TOOL AND STANDBY TIME CHANGING METHOD

CROSS-REFERENCE TO RELATED APPLICATION

This application is based upon and claims the benefit of priority from Japanese Patent Application No. 2017-110860 filed on Jun. 5, 2017, the contents of which are incorporated herein by reference.

BACKGROUND OF THE INVENTION

Field of the Invention

The present invention relates to a machine tool and a method of changing a standby time for clamping a rotary table following the elapse of the standby time after indexing of a rotary table is completed.

Description of the Related Art

Japanese Laid-Open Patent Publication No. 2015-087820 discloses that, in a machine tool equipped with a rotary table on which a workpiece is placed, the rotary table is clamped by a clamp mechanism after the rotary table has been rotated and positioned at a given target position.

SUMMARY OF THE INVENTION

In this instance, after having rotated and positioned the rotary table at the target position, the rotary table may continue to undergo rotation due to overshooting. Therefore, cases may occur in which the clamping operation is performed after a standby time has elapsed since positioning of the rotary table is completed.

Lengthening of the standby time leads to an extension of the cycle time. Thus, in order to shorten the cycle time, it is necessary to shorten the standby time. However, in the case that the amount of overshooting after completion of positioning of the rotary table is large, then if the waiting time is shortened, the rotary table is clamped at a position that is deviated from the target position, which adversely affects machining accuracy.

Thus, an object of the present invention is to provide a machine tool and a method of changing a standby time, which are effective to shorten the standby time until a clamping operation is started, while also suppressing any deterioration in machining accuracy.

A first aspect of the present invention is characterized by a machine tool comprising a rotary table adapted to support an object to be machined and which is capable of being rotated, and a clamp mechanism adapted to clamp the rotary table in a manner so that the rotary table does not rotate, wherein a clamping operation by the clamp mechanism is started after a standby time has elapsed from completion of indexing of the rotary table, the machine tool further comprising a positional deviation calculating unit adapted to calculate a positional deviation of the rotary table when the clamping operation by the clamp mechanism is completed, and a standby time changing unit adapted to shorten the standby time in the case that an absolute value of the positional deviation is less than a threshold value, and to lengthen the standby time in the case that the absolute value of the positional deviation is greater than the threshold value.

A second aspect of the present invention is characterized by a standby time changing method for changing a standby time of a machine tool comprising a rotary table adapted to support an object to be machined and which is capable of being rotated, and a clamp mechanism adapted to clamp the rotary table in a manner so that the rotary table does not rotate, wherein a clamping operation by the clamp mechanism is started after the standby time has elapsed from completion of indexing of the rotary table, the standby time changing method comprising a positional deviation calculating step of calculating a positional deviation of the rotary table when the clamping operation by the clamp mechanism is completed, and a standby time changing step of shortening the standby time in the case that an absolute value of the positional deviation is less than a threshold value, and lengthening the standby time in the case that the absolute value of the positional deviation is greater than the threshold value.

According to the present invention, it is possible to shorten the standby time until the clamping operation is started after completion of indexing, while also suppressing any deterioration in machining accuracy. As a result, it is possible to both suppress any deterioration in machining accuracy as well as realize a shortening of the cycle time.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 2 is a time chart showing rotation of a rotary table and a clamping operation in the case of using a conventional machine tool;

FIG. 3 is a time chart showing rotation of a rotary table and a clamping operation, in the case that an absolute value of a positional deviation is less than a threshold value;

FIG. 4 is a time chart showing rotation of the rotary table and the clamping operation, in the case that the absolute value of the positional deviation is greater than the threshold value; and FIG. 5 is a flowchart showing operations of the machine tool according to the present embodiment.

DESCRIPTION OF THE PREFERRED EMBODIMENTS

Figure 1:
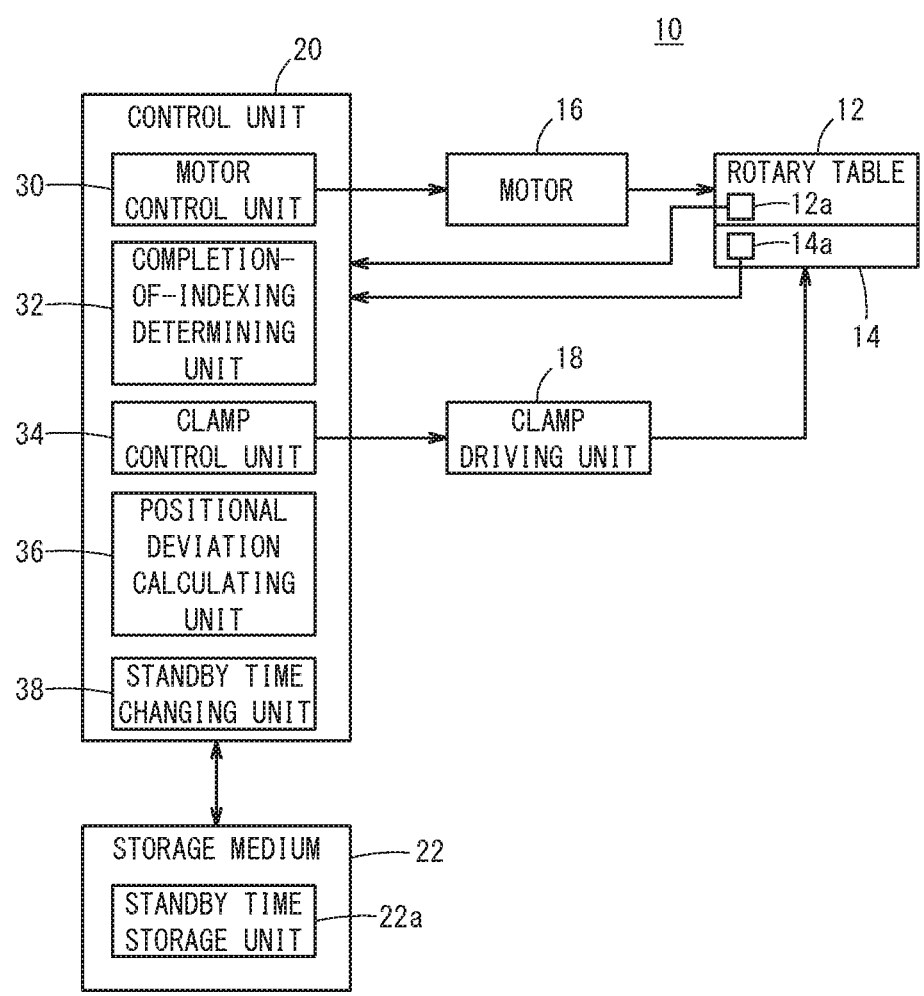
FIG. 1 is a configuration diagram of a machine tool according to an embodiment of the present invention.

Preferred embodiments of a machine tool and a standby time changing method according to the present invention will be presented and described in detail below with reference to the accompanying drawings.

FIG. 1 is a configuration diagram of a machine tool 10. The machine tool 10 is equipped with a rotary table 12, a clamp mechanism 14, a motor 16, a clamp drive unit 18, a control unit 20, and a storage medium 22.

The rotary table 12 is a table that supports an object to be machined by the machine tool 10, and the rotary table 12 is capable of being rotated (capable of turning). By rotating the rotary table 12, the object to be machined also rotates together with the rotary table 12. A rotation detecting unit 12a which detects the rotational position and the rotational speed of the rotary table 12 is provided on the rotary table 12. The rotation detecting unit 12a is constituted, for example, by an encoder or the like. A detection signal (a signal indicating the rotational position and the rotational speed) detected by the rotation detecting unit 12a is transmitted to the control unit 20.

The clamp mechanism 14 is a brake mechanism that clamps the rotary table 12 in a manner so that the rotary table 12 does not rotate. Although not illustrated in detail, the clamp mechanism 14, for example, may include a cylinder having a piston disposed therein, and a brake disk connected to the rotary table 12 may be disposed inside the cylinder. In this case, the piston moves to the side of the brake disc and presses the brake disc, whereby the clamp mechanism 14 clamps the rotary table 12. By including such a configuration, the clamp mechanism 14 can clamp or unclamp the rotary table 12. Any well-known type of clamp mechanism 14 can be used.

A clamping completion detecting unit 14a which detects whether or not the clamping operation by the clamp mechanism 14 has been completed is provided in the clamp mechanism 14. The clamping completion detecting unit 14a may be a sensor that detects whether or not the position of the piston has reached a predetermined position (a position where the piston abuts against the brake disc). Further, the clamping completion detecting unit 14a may be a sensor that detects whether or not a compressed fluid, which is supplied into the cylinder in order to move the piston to the side of the brake disc, becomes greater than or equal to a predetermined value. The detection signal detected by the clamping completion detecting unit 14a is transmitted to the control unit 20.

The motor 16 serves to rotate the rotary table 12, and is driven under the control of the control unit 20. The motor 16 may be a servomotor, for example.

The clamp drive unit 18 serves to drive the clamp mechanism 14, and is driven under the control of the control unit 20. The clamp drive unit 18 causes the clamp mechanism 14 to perform both clamping and unclamping. By moving the aforementioned piston of the clamp mechanism 14, the clamp drive unit 18 causes the clamp mechanism 14 to perform clamping and unclamping. For example, the clamp drive unit 18 may move the piston using a compressed fluid.

The control unit 20 is constituted by a processor such as a CPU or the like, and a memory or the like. The processor functions as the control unit 20 of the present embodiment by executing a non-illustrated program that is stored in the memory. The control unit 20 is equipped with a motor control unit 30, a completion of indexing determining unit 32, a clamp control unit 34, a positional deviation calculating unit 36, and a standby time changing unit 38. The storage medium 22 includes a standby time storage unit 22a in which the standby time WT is stored.

The motor control unit 30 drives the motor 16, and controls rotation of the rotary table 12. The motor control unit 30 controls rotation of the rotary table 12 in a manner so that the rotational position of the rotary table 12 becomes a target position (predetermined rotational angle position) TP. The motor control unit 30 feedback-controls the motor 16 on the basis of detection signals detected by the rotation detecting unit 12a.

Moreover, the motor control unit 30 may feedback-control the motor 16 on the basis of detection signals detected by a rotation detecting unit constituted by an encoder or the like which is provided separately on the motor 16. Further, the rotation detecting unit 12a may be disposed on the motor 16, and the rotation detecting unit 12a may detect the rotational position of the motor 16. This is because, by detecting the rotational position of the motor 16, it is possible to detect the rotational position of the rotary table 12.

The completion of indexing determining unit 32 determines whether or not indexing of the rotary table 12 has been completed. The completion of indexing determining unit 32 determines that indexing has been completed when the rotational position of the rotary table 12 enters within an in-position region. In the case that the rotational position of the rotary table 12 has reached the target position TP in a state in which the rotational speed of the rotary table 12 is less than or equal to a predetermined speed, the completion of indexing determining unit 32 determines that the rotational position of the rotary table 12 has entered into the in-position region. Upon determining that indexing of the rotary table 12 has been completed, the completion of indexing determining unit 32 outputs a signal indicating that indexing has been completed to the clamp control unit 34.

The clamp control unit 34 controls the clamp drive unit 18 in a manner so that the clamp mechanism 14 starts the clamping operation after the standby time WT has elapsed following completion of indexing of the rotary table 12. The standby time WT is read out from the standby time storage unit 22a by the clamp control unit 34. Upon completion of the clamping operation, the rotational position of the rotary table 12 is fixed. The clamp control unit 34 includes a timer (not shown) for measuring or clocking the time.

When completion of the clamping operation by the clamp mechanism 14 is detected by the clamping completion detecting unit 14a, the positional deviation calculating unit 36 calculates the positional deviation $\Delta P$ of the rotary table 12 when the clamping operation is completed. More specifically, the positional deviation calculating unit 36 calculates the positional deviation $\Delta P$ on the basis of the target position TP, and the rotational position (hereinafter indicated by FP) of the rotary table 12 when the clamping operation is completed. The positional deviation calculating unit 36 calculates the positional deviation $\Delta P$ using the relational expression, $\Delta P = FP - TP$. Moreover, the rotational position FP is detected by the rotation detecting unit 12a.

In the case it is determined that the absolute value of the positional deviation $\Delta P$ is less than the threshold value TH (in other words, if $|\Delta P| < TH$), the standby time changing unit 38 makes the standby time WT shorter than the current standby time WT. In the case it is determined that the absolute value of the positional deviation $\Delta P$ is greater than the threshold value TH (in other words, if $|\Delta P| > TH$), the standby time changing unit 38 makes the standby time WT longer than the current standby time WT. The standby time changing unit 38 stores the standby time WT after change thereof in the standby time storage unit 22a.

The standby time changing unit 38 may shorten the standby time WT by a first predetermined time period in the case that the absolute value of the positional deviation $\Delta P$ is less than the threshold value TH, and may lengthen the standby time WT by a second predetermined time period in the case that the absolute value of the positional deviation $\Delta P$ is greater than the threshold value TH. The first predetermined time period and the second predetermined time period may be the same or may be different from each other.

For example, by shortening the first predetermined time period and lengthening the second predetermined time period, in the case that the absolute value of the positional deviation $\Delta P$ is less than the threshold value, it is possible to prevent a sudden decrease in machining accuracy. Further, by shortening the first predetermined time period and lengthening the second predetermined time period, in the case that the absolute value of the positional deviation ΔP is greater than the threshold value, it is possible to immediately enhance the machining accuracy. In this manner, by having the first predetermined time period and the second predetermined time period be different from each other, it is possible to appropriately adjust the standby time WT in accordance with the circumstances.

In this instance, after having explained a conventional problem, operations of the machine tool 10 according to the present embodiment will be described. FIG. 2 is a time chart showing rotation of a rotary table and a clamping operation in the case of using a conventional machine tool.

As shown in FIG. 2, after indexing of the rotary table has been completed, the rotational position of the rotary table temporarily and significantly separates away from the target position TP due to overshooting, and thereafter, the rotational position of the rotary table converges on the target position TP.

Therefore, if the clamping operation is initiated immediately after indexing of the rotary table is completed, the machining accuracy is lowered, since the rotary table 12 is clamped at a rotational position that is significantly separated from the target position TP. Accordingly, the clamping operation is started after a sufficiently long standby time has elapsed from the completion of indexing of the rotary table. However, if the standby time is lengthened, the time required for machining becomes longer, and the cycle time also becomes longer.

Thus, according to the present embodiment, in the case that the absolute value of the positional deviation ΔP (=FP−TP) of the rotary table 12 after completion of the clamping operation is less than the threshold value TH, the standby time WT is shortened. On the other hand, in the case that the absolute value of the positional deviation ΔP of the rotary table 12 after completion of the clamping operation is greater than the threshold value TH, the standby time WT is lengthened. Consequently, it is possible to both suppress any deterioration in machining accuracy as well as realize a shortening of the cycle time.

FIG. 3 is a time chart showing rotation of the rotary table 12 and the clamping operation, in the case that the absolute value of the positional deviation ΔP is less than the threshold value TH, and FIG. 4 is a time chart showing rotation of the rotary table 12 and the clamping operation, in the case that the absolute value of the positional deviation ΔP is greater than the threshold value TH. Moreover, time t1 in FIGS. 3 and 4 indicates a timing at which it is determined that indexing of the rotary table 12 is completed, time t2 indicates a timing at which the clamping operation is started, and time t3 indicates a timing at which the clamping operation is completed.

As shown in FIG. 3, in the case that the absolute value of the positional deviation ΔP is less than the threshold value TH, the standby time WT can be shortened. Accordingly, in this case, the standby time changing unit 38 shortens the standby time WT. Consequently, it is possible to shorten the cycle time.

Conversely, as shown in FIG. 4, in the case that the absolute value of the positional deviation ΔP is greater than the threshold value TH, since the absolute value of the positional deviation ΔP must be less than or equal to the threshold value TH, the standby time changing unit 38 lengthens the standby time WT. Consequently, it is possible to prevent deterioration in machining accuracy. The threshold value TH is a value determined in consideration of the machining accuracy.

Moreover, in the case that the absolute value of the positional deviation ΔP is equal to the threshold value TH, the standby time changing unit 38 does not have to change the standby time WT. Further, in the case of changing the standby time WT in the event that the absolute value of the positional deviation ΔP is equal to the threshold value TH, the standby time changing unit 38 may make the standby time WT longer than the current standby time WT.

Next, operations of the machine tool 10 according to the present embodiment will be described with reference to the flowchart shown in FIG. 5. In step S1, the motor control unit 30 starts to control the rotary table 12 such that the rotary table 12 rotates to the target position TP.

In step S2, on the basis of the detection signal detected by the rotation detecting unit 12a, the completion of indexing determining unit 32 determines whether indexing of the rotary table 12 has been completed. If it is determined in step S2 that indexing of the rotary table 12 has not been completed, the process remains at step S2 until it is determined that indexing has been completed.

If it is determined in step S2 that indexing of the rotary table 12 has been completed, the clamp control unit 34 starts the timer (step S3), and determines whether or not the standby time WT has elapsed (step S4). If it is determined in step S4 that the standby time WT has not elapsed, the process remains at step S4 until it is determined that the standby time WT has elapsed.

If it is determined in step S4 that the standby time WT has elapsed, the process proceeds to step S5, whereupon the clamp control unit 34 controls the clamp drive unit 18 in a manner so that the clamp mechanism 14 starts the clamping operation.

Next, in step S6, the positional deviation calculating unit 36 determines whether or not the clamping operation is completed. The positional deviation calculating unit 36 performs such a determination on the basis of the detection signal detected by the clamping completion detecting unit 14a. If it is determined in step S6 that the clamping operation has not been completed, the process remains at step S6 until the clamping operation is completed.

If it is determined in step S6 that the clamping operation has been completed, the process proceeds to step S7, whereupon the positional deviation calculating unit 36 calculates the positional deviation ΔP (=FP−TP), on the basis of the target position TP, and the rotational position FP of the rotary table 12 after completion of the clamping operation as detected by the rotation detecting unit 12a.

Next, in step S8, the standby time changing unit 38 determines whether or not the absolute value of the positional deviation ΔP is less than the threshold value TH. If it is determined in step S8 that the absolute value of the positional deviation ΔP is less than the threshold value TH, the process proceeds to step S9, whereupon the standby time changing unit 38 makes the standby time WT shorter than the current standby time WT. On the other hand, if it is determined in step S8 that the absolute value of the positional deviation ΔP is not less than the threshold value TH, that is, if the absolute value of the positional deviation ΔP is greater than or equal to the threshold value TH, the process proceeds to step S10, whereupon the standby time changing unit 38 makes the standby time WT longer than the current standby time WT.

Moreover, although the standby time WT was lengthened (step S10) in the case that the absolute value of the positional deviation ΔP is equal to the threshold value TH (step S8: NO), the standby time changing unit 38 need not necessarily change the standby time WT in the case that the positional deviation ΔP is equal to the threshold value TH.

The standby time WT that was changed in steps S9 and S10 is stored in the standby time storage unit 22a.

[Technical Concepts Obtained from the Embodiments]

Technical concepts which can be grasped from the above-described embodiments will be described below.

<First Technical Concept>

The machine tool (10) is equipped with the rotary table (12) adapted to support an object to be machined and which is capable of being rotated, and the clamp mechanism (14) adapted to clamp the rotary table (12) in a manner so that the rotary table (12) does not rotate, wherein the clamping operation by the clamp mechanism (14) is started after the standby time (WT) has elapsed from completion of indexing of the rotary table (12). The machine tool (10) is further equipped with the positional deviation calculating unit (36) adapted to calculate the positional deviation (ΔP) of the rotary table (12) when the clamping operation by the clamp mechanism (14) is completed, and the standby time changing unit (38) adapted to shorten the standby time (WT) in the case that an absolute value of the positional deviation (ΔP) is less than a threshold value (TH), and to lengthen the standby time (WT) in the case that the absolute value of the positional deviation (ΔP) is greater than the threshold value (TH).

In accordance with these features, it is possible to shorten the standby time (WT) until the clamping operation is started after completion of indexing, while also suppressing any deterioration in machining accuracy. As a result, it is possible to both suppress any deterioration in machining accuracy as well as realize a shortening of the cycle time.

The standby time changing unit (38) may shorten the standby time (WT) by the first predetermined time period in the case that the absolute value of the positional deviation (ΔP) is less than the threshold value (TH), and may lengthen the standby time (WT) by the second predetermined time period in the case that the absolute value of the positional deviation (ΔP) is greater than the threshold value (TH). In accordance with this feature, it is possible to appropriately adjust the standby time (WT) in accordance with the circumstances.

The machine tool (10) may further comprise the rotation detecting unit (12a) adapted to detect the rotational position and the rotational speed of the rotary table (12), the motor (16) that rotates the rotary table (12), the motor control unit (30) adapted to control the motor (16) in a manner so that the rotational position of the rotary table (12) becomes the predetermined rotational angle position (TP), the completion of indexing determining unit (32) adapted to determine completion of indexing of the rotary table (12), in the case that the rotational position of the rotary table (12) has reached the predetermined rotational angle position (TP) in a state in which the rotational speed of the rotary table (12) is less than or equal to the predetermined speed, the clamp drive unit (18) adapted to drive the clamp mechanism (14), the clamp control unit (34) adapted to control the clamp drive unit (18) in a manner so that the clamp mechanism (14) starts the clamping operation after elapse of the standby time (WT) from completion of indexing of the rotary table (12), and the clamping completion detecting unit (14a) adapted to detect completion of the clamping operation. The positional deviation calculating unit (36) may calculate the positional deviation (ΔP), on the basis of the predetermined rotational angle position (TP), and the rotational position (FP) of the rotary table (12) when the clamping operation is completed.

<Second Technical Concept>

The standby time changing method changes the standby time (WT) of the machine tool (10), which comprises the rotary table (12) adapted to support an object to be machined and which is capable of being rotated, and the clamp mechanism (14) adapted to clamp the rotary table (12) in a manner so that the rotary table (12) does not rotate, wherein the clamping operation by the clamp mechanism (14) is started after the standby time (WT) has elapsed from completion of indexing of the rotary table (12). The standby time changing method comprises the positional deviation calculating step of calculating the positional deviation (ΔP) of the rotary table (12) when the clamping operation by the clamp mechanism (14) is completed, and the standby time changing step of shortening the standby time (WT) in the case that an absolute value of the positional deviation (ΔP) is less than a threshold value (TH), and lengthening the standby time (WT) in the case that the absolute value of the positional deviation (ΔP) is greater than the threshold value (TH).

In accordance with these features, it is possible to shorten the standby time (WT) until the clamping operation is started after completion of indexing, while also suppressing any deterioration in machining accuracy. As a result, it is possible to both suppress any deterioration in machining accuracy as well as realize a shortening of the cycle time.

In the standby time changing step, the standby time (WT) may be shortened by the first predetermined time period in the case that the absolute value of the positional deviation (ΔP) is less than the threshold value (TH), and may be lengthened by the second predetermined time period in the case that the absolute value of the positional deviation (ΔP) is greater than the threshold value (TH). In accordance with this feature, it is possible to appropriately adjust the standby time (WT) in accordance with the circumstances.

The machine tool (10) may further comprise the motor (16) that rotates the rotary table (12), the clamp drive unit (18) adapted to drive the clamp mechanism (14), the rotation detecting unit (12a) adapted to detect the rotational position and the rotational speed of the rotary table (12), and the clamping completion detecting unit (14a) adapted to detect completion of the clamping operation. The standby time changing method may further comprise the motor controlling step of controlling the motor (16) in a manner so that the rotational position of the rotary table (12) becomes a predetermined rotational angle position (TP), the completion of indexing determining step of determining completion of indexing of the rotary table (12), in the case that the rotational position of the rotary table (12) has reached the predetermined rotational angle position (TP) in a state in which the rotational speed of the rotary table (12) is less than or equal to a predetermined speed, and the clamp controlling step of controlling the clamp drive unit (18) in a manner so that the clamp mechanism (14) starts the clamping operation after elapse of the standby time (WT) from completion of indexing of the rotary table (12). In the positional deviation calculating step, the positional deviation (ΔP) may be calculated on the basis of the predetermined rotational angle position (TP), and the rotational position (FP) of the rotary table (12) when the clamping operation is completed.

Though the present invention has been described by referring to the embodiments, the present invention should not be limited to the above embodiments. It goes without saying that various modifications and improvements can be added to the above embodiments. Further, it is also apparent from the scope of claims that embodiments added with such modifications and improvements can be incorporated in the technical scope of the invention.

What is claimed is:

1. A machine tool comprising:
a rotary table adapted to support an object to be machined and which is capable of being rotated; and
a clamp mechanism adapted to clamp the rotary table in a manner so that the rotary table does not rotate;
wherein a clamping operation by the clamp mechanism is started after a standby time has elapsed from completion of indexing of the rotary table;
the machine tool further comprising:
a positional deviation calculating unit adapted to calculate a positional deviation of the rotary table when the clamping operation by the clamp mechanism is completed; and
a standby time changing unit adapted to shorten the standby time in the case that an absolute value of the positional deviation is less than a threshold value, and to lengthen the standby time in the case that the absolute value of the positional deviation is greater than the threshold value,
wherein the standby time is set to be, as an initial value, longer than a time period required for overshooting to converge.

2. The machine tool according to claim 1, wherein the standby time changing unit shortens the standby time by a first predetermined time period in the case that the absolute value of the positional deviation is less than the threshold value, and lengthens the standby time by a second predetermined time period in the case that the absolute value of the positional deviation is greater than the threshold value.

3. The machine tool according to claim 1, further comprising:
a rotation detecting unit adapted to detect a rotational position and a rotational speed of the rotary table;
a motor that rotates the rotary table;
a motor control unit adapted to control the motor in a manner so that the rotational position of the rotary table becomes a predetermined rotational angle position;
a completion of indexing determining unit adapted to determine completion of indexing of the rotary table, in the case that the rotational position of the rotary table has reached the predetermined rotational angle position in a state in which the rotational speed of the rotary table is less than or equal to a predetermined speed;
a clamp drive unit adapted to drive the clamp mechanism;
a clamp control unit adapted to control the clamp drive unit in a manner so that the clamp mechanism starts the clamping operation after elapse of the standby time from completion of indexing of the rotary table; and
a clamping completion detecting unit adapted to detect completion of the clamping operation;
wherein the positional deviation calculating unit calculates the positional deviation, on the basis of the predetermined rotational angle position, and the rotational position of the rotary table when the clamping operation is completed.

4. A standby time changing method for changing a standby time of a machine tool comprising:
a rotary table adapted to support an object to be machined and which is capable of being rotated; and
a clamp mechanism adapted to clamp the rotary table in a manner so that the rotary table does not rotate;
wherein a clamping operation by the clamp mechanism is started after the standby time has elapsed from completion of indexing of the rotary table;
the standby time changing method comprising:
a positional deviation calculating step of calculating a positional deviation of the rotary table when the clamping operation by the clamp mechanism is completed; and
a standby time changing step of shortening the standby time in the case that an absolute value of the positional deviation is less than a threshold value, and lengthening the standby time in the case that the absolute value of the positional deviation is greater than the threshold value,
wherein the standby time is set to be, as an initial value, longer than a time period required for overshooting to converge.

5. The standby time changing method according to claim 4, wherein, in the standby time changing step, the standby time is shortened by a first predetermined time period in the case that the absolute value of the positional deviation is less than the threshold value, and is lengthened by a second predetermined time period in the case that the absolute value of the positional deviation is greater than the threshold value.

6. The standby time changing method according to claim 4, wherein the machine tool further comprises:
a motor that rotates the rotary table;
a clamp drive unit adapted to drive the clamp mechanism;
a rotation detecting unit adapted to detect a rotational position and a rotational speed of the rotary table; and
a clamping completion detecting unit adapted to detect completion of the clamping operation;
the standby time changing method further comprising:
a motor controlling step of controlling the motor in a manner so that the rotational position of the rotary table becomes a predetermined rotational angle position;
a completion of indexing determining step of determining completion of indexing of the rotary table, in the case that the rotational position of the rotary table has reached the predetermined rotational angle position in a state in which the rotational speed of the rotary table is less than or equal to a predetermined speed; and
a clamp controlling step of controlling the clamp drive unit in a manner so that the clamp mechanism starts the clamping operation after elapse of the standby time from completion of indexing of the rotary table;
wherein, in the positional deviation calculating step, the positional deviation is calculated on the basis of the predetermined rotational angle position and the rotational position of the rotary table when the clamping operation is completed.

* * * * *